July 7, 1925.
H. M. LUDWICK
LUBRICATOR
Filed Feb. 25, 1920
1,545,149
2 Sheets-Sheet 1
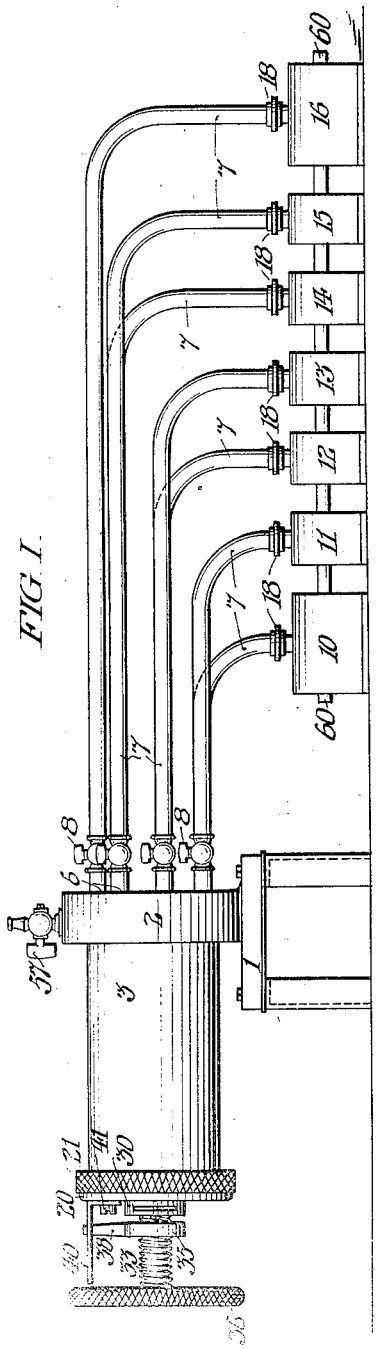
FIG. I.
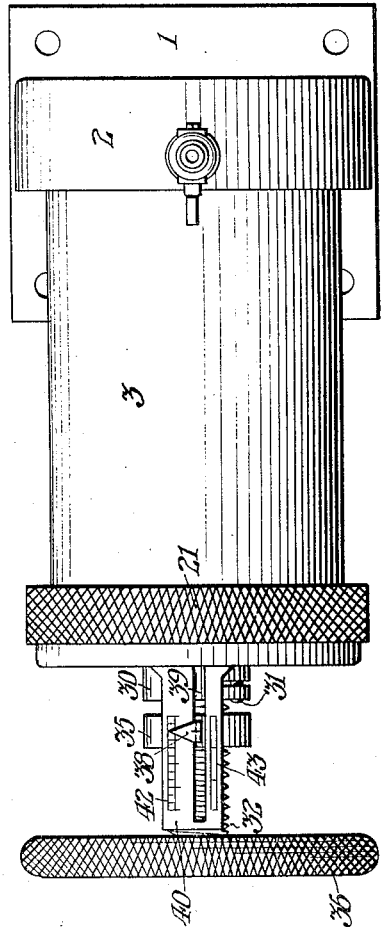
FIG. II.
INVENTOR:
HARLAN M. LUDWICK,

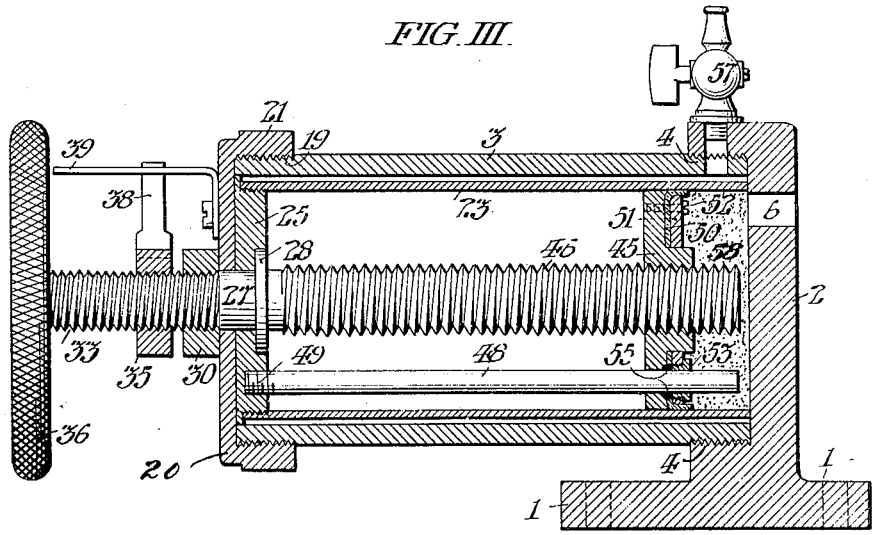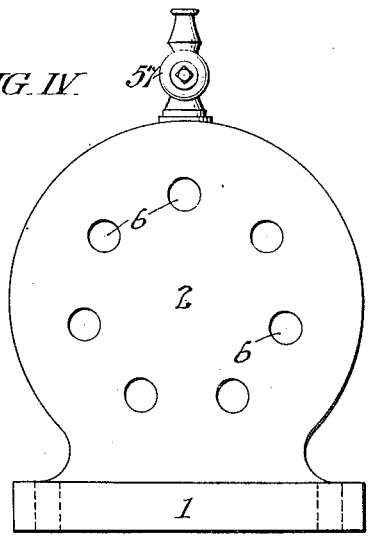

Patented July 7, 1925.

1,545,149

UNITED STATES PATENT OFFICE.

HARLAN M. LUDWICK, OF PARKESBURG, PENNSYLVANIA.

LUBRICATOR.

Application filed February 25, 1920. Serial No. 361,181.

*To all whom it may concern:*

Be it known that I, HARLAN M. LUDWICK, residing at Parkesburg, in the county of Chester and State of Pennsylvania, have invented a certain new and useful Improvement in Lubricators, whereof the following is a specification, reference being had to the accompanying drawings.

My invention was designed to lubricate the bearings of a rolling mill employed to roll sheet iron three-eighths of an inch thick to a feather edge for lap welding. The stress upon that mechanism was such that it was necessary to renew the bearings at intervals of one week, although five barrels of oil were used to lubricate them in every twenty-four hours. Of course, a large percentage of the oil thus supplied to said bearings was wasted. Therefore, the general object and effect of my invention is to supply grease to such bearings at a precisely determined rate; so that only as much lubricant is applied as is necessary to maintain the bearings operative. I found that by the employment of my invention, eight pounds of #3 Keystone grease, uniformly supplied to the rolling mill aforesaid, throughout twenty-four hours, adequately lubricated the bearings to which the five barrels of oil were theretofore supplied every twenty-four hours, as above noted, and the bearings have not been renewed.

As hereinafter described, my invention includes a lubricator comprising a casing arranged to be charged with grease and having a conduit leading therefrom to each of the bearings with which said lubricator is designed to cooperate; each of said conduits being provided with a separate valve to control the passage of lubricant therethrough. Said casing is charged with grease in a container which fits in said casing and is connected with a cover for said casing, and the grease is discharged from said container, within said casing, and through the conduits leading from the latter, by means of a diaphragm like a piston head, movable axially in said container. Such axial movement of said diaphragm is conveniently effected by a screw shaft which is mounted to rotate in the casing cover aforesaid and has a screw thread extending axially with respect to said container and casing, and in engagement with said diaphragm which is screw threaded as a nut on said shaft. Rotation of said diaphragm is prevented by a rod extending through said diaphragm in rigid connection with said container, at the outer end of the latter. Said shaft is arranged to be conveniently rotated by a hand wheel exterior to said casing, and, means are provided to indicate, exterior to said casing, the relative axial position of said diaphragm, within said casing, including a screw thread on said screw shaft exterior to said casing, in threaded engagement with an indicator nut, carrying an index pointer, in position to traverse a stationary scale. The screw thread which connects said screw shaft with said diaphragm is much coarser than the screw thread on said screw shaft which cooperates with said indicator; so that said indicator does not move to the same extent as the diaphragm but only in a predetermined ratio with respect thereto, so as to minimize the length of the indicator screw required.

My invention includes the various novel features of construction and arrangement hereinafter more definitely specified.

In the drawings; Fig. I is a side elevation of a lubricator embodying my invention, in cooperative relation with seven bearings.

Fig. II is a plan view of said lubricator.

Fig. III is a central longitudinal sectional view of said lubricator taken on the line III, III in Fig. II.

Fig. IV is an elevation of the lubricator base which is at the discharge end of the lubricator casing as shown in Figs. I and II.

In said figures; the lubricator base 1 is provided with the standard 2 which forms the right hand end of the lubricator casing 3 as shown in Figs. I and II; said casing being screw threaded at 4 in engagement with said base. As best shown in Fig. IV; said base standard 2 has a circular series of seven discharge ports 6 which are respectively provided with grease conduits 7 controlled by respective individual valves 8 and leading to the bearings 10, 11, 12, 13, 14, 15 and 16 with which said conduits are conveniently respectively connected by union couplings 18.

Said lubricator casing 3 is conveniently formed of a cylindrical tube, having the screw thread 19 at its end remote from said base 1, for engagement with the rotary casing cover 20 which may be conveniently knurled as indicated at 21 to facilitate turning the same into and out of engagement with said casing, The grease container comprises the cylindrical tube 23 having the internal screw thread 24, rigidly connecting it with the circular disk head 25, which forms a closure for the outer end of said container 23, and said head is held, in the position shown, in said cover 20, by the screw shaft 27 which has the flange 28 at the inner side of said head 25 and the nut 30 bearing upon the outer side of said cover 20; said nut 30 being split, semicircularly, so that the bifurcations thereof thus formed may be forced apart by the set screw 31, to jam said nut in the position shown, upon the screw thread 33 on said shaft 27. The indicator nut 35 is fitted upon said screw thread 33 so as to be shifted axially thereon when said shaft 27 is turned, conveniently by the hand wheel 36. Said indicator nut 35 carries the pointer 38 extending through the slot 39 in the scale plate 40 which is connected in stationary relation with said cover, by the screws 41. Said pointer 38 is adapted to traverse the scales 42 and 43 formed by graduations on said scale plate 40, as best shown in Fig. II, and thus indicate the relative position of the diaphragm 45 which is fitted, as a nut, upon the screw thread 46 of said shaft 27, extending axially within said container 23 and, in coaxial relation with said lubricator casing 3.

Of course, said indicator nut 35 would rotate with said screw 33 on said shaft 27 and thus fail to perform its function, unless means be provided to prevent such rotation. Therefore, it may be observed that said scale plate 40 prevents rotation of said indicator nut 35 by engagement of said pointer 38 on said nut in said slot 39 of said plate.

It is to be understood that although said cover 20 of the lubricator casing 3 is coupled to said head 25 of the grease container 23, as above described, it is free to rotate with respect thereto, upon said screw shaft 27, until the parts are in the normal operative position shown, wherein said cover 20 jams said container 23 between the inner face of said standard 2 and the inner face of said cover 20, in which jammed position, said container 23 is prevented from rotation.

In order to prevent said diaphragm 45 from turning idly in said container 23, when said screw shaft 27 is turned, and thus compel said diaphragm to move axially in said container; I rigidly connect the rod 48, at its outer end 49, in the container head 25, in the eccentric relation to said shaft 27, best shown in Fig. III, and extend said rod through said diaphragm 45.

In order to render said diaphragm 45 grease tight, in said grease container 23; I provide the cup leather 50 which fits said container 23, and is held upon said diaphragm 45 by the clamp ring 51, which is secured by three screws 52 and, in order to prevent the escape of grease outwardly through said diaphragm around said rod 48, I provide the latter with the bushing sleeve 53, shown in Fig. III, which is in screw threaded engagement with said clamp ring 51 and presses upon the packing 55 encircling said rod between said diaphragm 45 and said clamp ring 51, as shown in Fig. III. In order to permit the escape of air from the interior of said casing 3 when said grease container 23 is inserted therein, as above described, I find it convenient to provide said standard 2 with the vent cock 57.

The apparatus above described is used as follows: Said cover 20 is unscrewed from said lubricator casing 3, carrying with it the grease container 23, and the hand wheel 36 is turned until the diaphragm 45 is withdrawn to the outer limit of its movement. Said container is then charged with grease 58, flush with the right hand end thereof as shown in Fig. III. Said vent cock 57 being opened; said container 23 is inserted in said casing 3 and said cover 20 screwed upon the end of said casing 3, until the parts are assembled in the position shown in Fig. III, in which said container 23 is clamped in said casing 3, in stationary position, and in grease-tight relation with said base standard 2. Thereupon, said vent cock 57 is closed. The valve 8 of the longest conduit 7, leading to the bearing 16, is then opened, and the union coupling 18 of that conduit also opened. The valves 8 of all of the other conduits being closed; the only outlet afforded from said grease container 23 is the port 6 opening into said longest conduit 7 leading to said bearing 16. Thereupon, said hand wheel 36 is rotated to axially shift said diaphragm 45 to the right in Fig. III to force the grease 58 to fill said longest conduit 7 down to its union 18. That union is then closed and the stop cock 8 of that conduit, of the bearing 16, also closed, and the union coupling 18 of the next shorter conduit, leading to the bearing 15, opened, and its valve 8 opened until that conduit of the bearing 15, is filled with grease in the same manner as above described with reference to the conduit of the bearing 16. Each of the other conduits, leading to the bearings 10 to 14 inclusive, is filled with grease in the same way; so that, thereafter, when all of the valves 8 are opened, and the grease 58 compressed within said container 23, by rotation of said hand wheel 36, the grease is distributed to all of said bearings 10 to 16 inclusive simultaneously.

Of course, the rate at which grease is injected into said bearings 10 to 16 inclusive, as above described, may be precisely determined by reference to the position of the pointer 38 in relation to the scales 42 and 43 upon said scale plate 40. I have shown the two series of graduations 42 and 43 upon said scale plate to facilitate injection of grease at respectively different rates. I do not desire to limit my invention to the above contemplated embodiment in a rolling mill and, therefore, have not attempted to show in said drawings the details of construction and arrangement of the rolls of such a mill but have shown a single shaft 60 extending through all of said bearings 10 to 16 inclusive, as sufficiently illustrating the principle of operation of my invention. Of course, my invention is applicable to lubricate bearings of any kind; for instance, a single lubricator casing, such as above described, may be located in the operator's cage of a traveling crane in connection with conduits leading to such bearings of the crane as it may be desired to lubricate; so that the operator may lubricate those bearings without leaving the cage. Similarly, a single lubricator may be mounted in a position accessible from the chauffeur's seat in an automobile and connected with all of the bearings of the automobile which it is desired to lubricate; so that such bearings may be lubricated by the chauffeur, without leaving said seat. However, in any installation of my improved lubricating apparatus upon mechanism which is subjected to vibration; I prefer to dispense the grease through flexible conduits, conveniently of the spiral armored type.

Of course, the diaphragm 45 above described might be directly fitted in the lubricator casing 3, but, such construction would necessitate removal of the diaphragm and refitting thereof to the surface upon which it slides, every time it was desired to insert a new charge of grease. Therefore, it is more convenient to mount said diaphragm in the container 23, not only to avoid that trouble but to afford what is in effect a portable cartridge which may be charged with grease with greater facility than the stationary casing 3.

Therefore, I do not desire to limit myself to the precise details of construction and arrangement herein set forth, as it is obvious that various modifications may be made therein, without departing from the essential features of my invention, as defined in the appended claims.

I claim:

1. In a lubricator, the combination with a cylindrical casing having a port arranged to dispense lubricant; of a grease container comprising a tube adapted to fit in said casing in coaxial relation therewith; a diaphragm fitted to slide axially in said container; a screw shaft journaled in said container, in coaxial relation therewith, and extending through said diaphragm which engages said screw shaft as a nut; a removable cover for said casing mounted to rotate on said screw shaft exterior to said container; and means, carried by said screw shaft, retaining said cover in connection with said container, including a nut on said shaft, and means arranged to clamp said nut in adjusted position.

2. In a lubricator, the combination with a cylindrical casing having a port arranged to dispense lubricant; of a grease container comprising a tube adapted to fit in said casing in coaxial relation therewith; a diaphragm fitted to slide axially in said container; a screw shaft journaled in said container, in coaxial relation therewith and extending through said diaphragm which engages said screw shaft as a nut; a removable cover for said casing mounted to rotate on said screw shaft exterior to said container; and means, carried by said screw shaft, retaining said cover in connection with said container.

3. In a lubricator, the combination with a casing having a port arranged to dispense lubricant; of a grease container comprising a tube adapted to fit in said casing in coaxial relation therewith; a diaphragm in said casing, fitted to slide axially in said container; a screw shaft journaled in said container and engaged by said diaphragm as a nut; and means retaining said shaft in said container, including a split nut on said shaft exterior to said container; and a clamping screw arranged to flex said split nut.

4. In a lubricator, the combination with a casing having a port arranged to dispense lubricant; of a grease container comprising a tube adapted to fit in said casing in coaxial relation therewith; a diaphragm in said casing, fitted to slide axially in said container; a screw shaft journaled in said container and engaged by said diaphragm as a nut; and means retaining said shaft in said container, including a nut on said shaft exterior to said container.

In testimony whereof, I have hereunto signed my name at Parkesburg, Pennsylvania, this eighteenth day of December, 1919.

HARLAN M. LUDWICK.

Witnesses:
H. BENSON WIESE,
CHESTER L. FRANKHOUSER.